(12) United States Patent
Masuyama et al.

(10) Patent No.: US 10,457,561 B2
(45) Date of Patent: Oct. 29, 2019

(54) LIQUID COMPOSITION FOR FORMING SILICA POROUS FILM AND SILICA POROUS FILM FORMED FROM SUCH LIQUID COMPOSITION

(71) Applicant: MITSUBISHI MATERIALS CORPORATION, Tokyo (JP)

(72) Inventors: Koutaro Masuyama, Ushiku (JP); Satoko Higano, Naka-gun (JP); Kazuhiko Yamasaki, Naka-gun (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 154 days.

(21) Appl. No.: 15/124,114

(22) PCT Filed: Mar. 11, 2015

(86) PCT No.: PCT/JP2015/057161
§ 371 (c)(1),
(2) Date: Sep. 7, 2016

(87) PCT Pub. No.: WO2015/137399
PCT Pub. Date: Sep. 17, 2015

(65) Prior Publication Data
US 2017/0015561 A1    Jan. 19, 2017

(30) Foreign Application Priority Data

Mar. 11, 2014  (JP) ................. 2014-047439
Dec. 22, 2014  (JP) ................. 2014-258617

(51) Int. Cl.
*C01B 33/12* (2006.01)
*B01D 53/22* (2006.01)
(Continued)

(52) U.S. Cl.
CPC .......... *C01B 33/126* (2013.01); *B01D 53/228* (2013.01); *B01D 67/0048* (2013.01);
(Continued)

(58) Field of Classification Search
CPC ................ C01B 33/126; B01D 53/228; B01D 67/0048; B01D 71/027; B01J 21/08;
(Continued)

(56) References Cited

U.S. PATENT DOCUMENTS 6,083,314 A    7/2000   Nakashima et al.
6,403,162 B1   6/2002   Tokunaga et al.
(Continued)

FOREIGN PATENT DOCUMENTS

CN    1501454 A    6/2004
CN    1519197 A    8/2004
(Continued)

OTHER PUBLICATIONS

Office Action dated Apr. 1, 2017, issued for the Chinese patent application No. 201580006551.1 and a partial English translation of the Search Report.
(Continued)

*Primary Examiner* — Melvin C. Mayes
*Assistant Examiner* — Michael Forrest
(74) *Attorney, Agent, or Firm* — Locke Lord LLP; James E. Armstrong, IV; Nicholas J. DiCeglie, Jr.

(57) ABSTRACT

A liquid composition for forming a silica porous film of the invention is prepared by mixing a hydrolyzate of tetramethoxysilane or tetraethoxysilane as a silicon alkoxide with a silica sol in which fumed silica particles having primary particles having a mean particle diameter of 40 nm or less and secondary particles having a mean particle diameter of 20 nm to 400 nm, that is greater than the mean particle diameter of the primary particles, are dispersed in a liquid medium, in which the mass ratio (A/B) of the $SiO_2$ content (B) of the silica sol to the $SiO_2$ content (A) in the hydrolyzate is in a range of 1/99 to 60/40.

3 Claims, 1 Drawing Sheet

(51) Int. Cl.
- *B01D 67/00* (2006.01)
- *B01D 71/02* (2006.01)
- *B01J 21/08* (2006.01)
- *B01J 35/00* (2006.01)
- *B01J 37/02* (2006.01)
- *C09D 1/00* (2006.01)

(52) U.S. Cl.
CPC ............ *B01D 71/027* (2013.01); *B01J 21/08* (2013.01); *B01J 35/0013* (2013.01); *B01J 37/0215* (2013.01); *B01J 37/0236* (2013.01); *C09D 1/00* (2013.01); *B01D 2325/02* (2013.01)

(58) Field of Classification Search
CPC ................ B01J 35/0013; B01J 37/0215; B01J 37/0236; C09D 1/00
See application file for complete search history.

(56) References Cited

U.S. PATENT DOCUMENTS

| | | |
|---|---|---|
| 2004/0091419 A1 | 5/2004 | Ogihara et al. |
| 2004/0105986 A1 | 6/2004 | Ogihara et al. |
| 2004/0248995 A1 | 12/2004 | Glaubitt et al. |
| 2005/0223945 A1 | 10/2005 | Baumgart et al. |
| 2006/0124593 A1 | 6/2006 | Moyaerts et al. |
| 2008/0171441 A1* | 7/2008 | Takemiya ................ C09G 1/02 438/693 |
| 2009/0186210 A1 | 7/2009 | Fujii et al. |
| 2009/0278080 A1* | 11/2009 | Ohta ........................ C09G 1/02 252/79.1 |

FOREIGN PATENT DOCUMENTS

| | | | |
|---|---|---|---|
| CN | 1651159 | 8/2005 | |
| EP | 1887059 A1 | 2/2008 | |
| JP | 62-230609 A | 10/1987 | |
| JP | 09-040478 A | 2/1997 | |
| JP | 11-061043 A | 3/1999 | |
| JP | 2001-019421 A | 1/2001 | |
| JP | 2003-201112 A | 7/2003 | |
| JP | 2003193038 A * | 7/2003 | ............... C09K 3/14 |
| JP | 2004-168615 A | 6/2004 | |
| JP | 2005-514299 A | 5/2005 | |
| JP | 2006-036598 A | 2/2006 | |
| JP | 2007-321092 A | 12/2007 | |
| JP | 2009-209282 A | 9/2009 | |
| JP | 2010-189212 A | 9/2010 | |

OTHER PUBLICATIONS

Supplementary Search Report dated Aug. 2, 2017, issued for the European patent application No. 15761609.5.
International Search Report dated Jun. 9, 2015, issued for PCT/JP2015/057161 and English translation thereof.

* cited by examiner

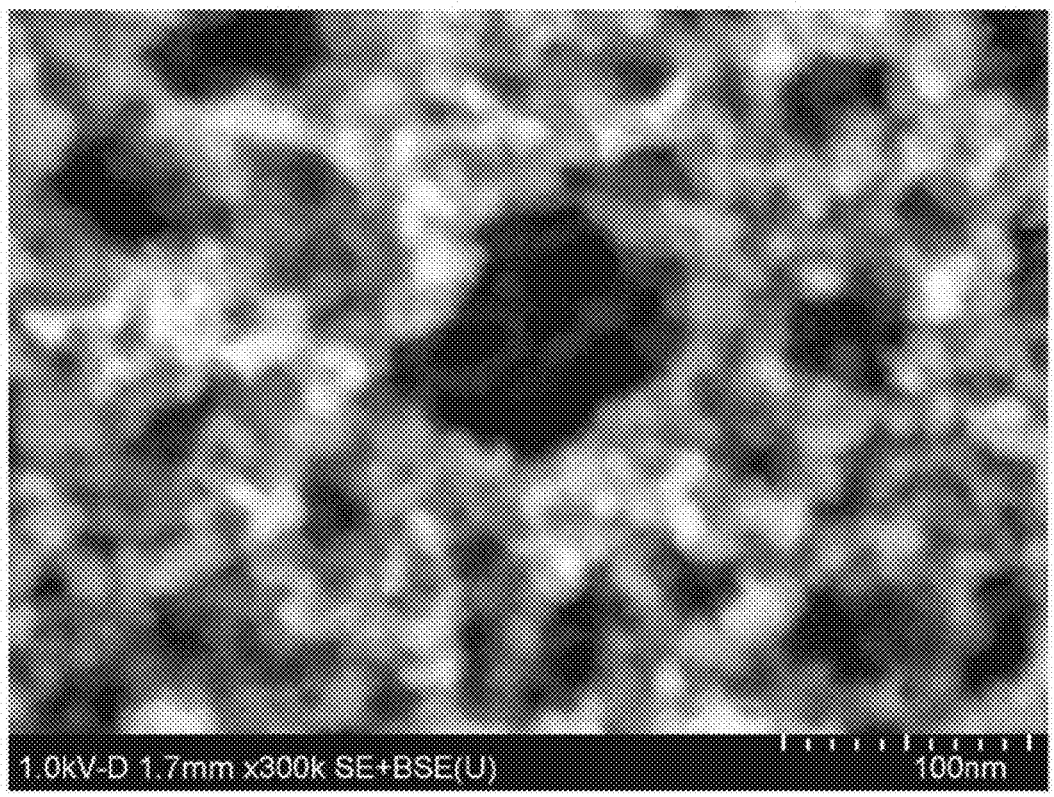

LIQUID COMPOSITION FOR FORMING SILICA POROUS FILM AND SILICA POROUS FILM FORMED FROM SUCH LIQUID COMPOSITION

TECHNICAL FIELD

The present invention relates to a liquid composition for forming a silica porous film having a porous structure in which the hole diameter is easily controlled to be a desired hole diameter, and a silica porous film formed from the liquid composition. More specifically, the present invention relates to a liquid composition for forming a silica porous film suitable for use in a catalyst carrier, a gas filter, a filter body, or the like, and a silica porous film formed from the liquid composition.

Priority is claimed on Japanese Patent Application No. 2014-047439, filed Mar. 11, 2014, and Japanese Patent Application No. 2014-258617, filed Dec. 22, 2014, the contents of which are incorporated herein by reference.

BACKGROUND ART

In the past, as a method of manufacturing an open pore-type porous body for use in a catalyst carrier, a gas filter, a filter body, or the like, a method of manufacturing an open pore-type porous body having: a fine pore film on a surface of an open pore-type porous laminated body inclined such that fine pore diameters become successively smaller toward the surface; or a fine pore layer at a slight depth from the surface has been disclosed (for example, see Patent Document 1). This method is characterized in that a thin film or a surface layer is formed on a surface of the open pore-type porous laminated body through any one of a gas phase chemical reaction method, a vacuum deposition method, an ion plating method, and a sputtering method. According to this method, since it is possible to form the fine pore layer in from particle units to atom units, the arrangement of particles can be easily optimized, and thus the transmission performance and the separation performance of the layer can be improved.

A porous silica film formed by: coating a support with a silica sol obtained by hydrolyzing a reaction material including a silicon alkoxide, water, and nitric acid; and baking the support has been disclosed (for example, see Patent Document 2). In this porous silica film, many pores are formed in the silica film, a mean diameter of the pores is 1 nm or greater, and preferably 1 nm to 5 nm, and separation or filtering of nanoparticles from, for example, a liquid material such as water or an organic solvent is possible.

CITATION LIST

Patent Literature

[Patent Document 1] Japanese Unexamined Patent Application, First Publication No. H9-40478 (Claim 1, Paragraphs [0001] and [0011])

[Patent Document 2] Japanese Unexamined Patent Application, First Publication No. 2004-168615 (Claim 1, Claim 5, Paragraph [0015], and Abstract)

DISCLOSURE OF INVENTION

Technical Problem

However, as shown in Patent Document 1, in the case in which the fine pore film or the fine pore layer is manufactured by a gas phase method such as a gas phase chemical reaction method, a vacuum deposition method, an ion plating method, or a sputtering method, there is a problem with the manufacturing cost and the like since an expensive apparatus and the like are used. Therefore, recently, a method of manufacturing a porous film by a coating method such as a sol-gel method has attracted attention due to the manufacturing cost and the like. In the sol-gel method, generally, a sol-gel liquid is prepared and coated on a base material such as an open pore-type porous laminated body shown in Patent Document 1, a glass substrate, or a plastic film, and then dried or baked to form a film. However, the film formed by the sol-gel method has problems in that the hole diameter cannot be controlled to be a desired hole diameter, or defective adhesion to the base material and the generation of cracks easily occur in comparison to a case of a film formed by the gas phase method such as a vacuum deposition method.

The porous silica film shown in Patent Document 2 is intended to separate or filter nanoparticles from a liquid material such as water or an organic solvent, and has a defect in that it is not suitable for separation of particles having a mean particle diameter of 10 nm to 200 nm.

An object of the invention is to provide: a liquid composition for forming a silica porous film in which the hole diameter can be easily controlled to be a desired hole diameter, which has good adhesion to a base material, and in which it is difficult for generation of cracks to occur; and a silica porous film formed from the liquid composition.

Another object of the invention is to provide a silica porous film suitable for separating particles having a mean particle diameter of 10 nm to 200 nm.

Solution to Problem

A liquid composition for forming a silica porous film of a first aspect of the invention is prepared by mixing a hydrolyzate of tetramethoxysilane or tetraethoxysilane as a silicon alkoxide with a silica sol in which fumed silica particles having primary particles having a mean particle diameter of 40 nm or less and secondary particles having a mean particle diameter of 20 nm to 400 nm, that is greater than the mean particle diameter of the primary particles, are dispersed in a liquid medium, and the mass ratio (A/B) of a $SiO_2$ content (B) of the silica sol to a $SiO_2$ content (A) in the hydrolyzate is in a range of 1/99 to 60/40.

A silica porous film forming method of a second aspect of the invention is a method of forming a silica porous film using the liquid composition according to the first aspect.

A silica porous film of a third aspect of the invention includes: fumed silica particles having primary particles having a mean particle diameter of 40 nm or less and secondary particles having a mean particle diameter of 20 nm to 400 nm, that is greater than the mean particle diameter of the primary particles; and an amorphous $SiO_2$ component existing between the fumed silica particles or between a coating film and a substrate, and a mean hole diameter of the film is in a range of 10 nm to 200 nm.

A silica porous film forming method of a fourth aspect of the invention is the invention based on the second aspect, and includes the steps of: coating a substrate with the liquid composition; and baking the substrate coated with the liquid composition to harden the liquid composition coated on the substrate.

Advantageous Effects of Invention

According to the liquid composition of the first aspect of the invention, a silica porous film in which the hole diameter is controlled to be a desired hole diameter can be formed by appropriately selecting a mass ratio (A/B) of the $SiO_2$ content (B) of a silica sol in which fumed silica particles having primary particles having a mean particle diameter of 40 nm or less and secondary particles having a mean particle diameter of 20 nm to 400 nm, that is greater than the mean particle diameter of the primary particles, are dispersed in a liquid medium to the $SiO_2$ content (A) of a hydrolyzate of tetramethoxysilane or tetraethoxysilane as a silicon alkoxide in a range of 1/99 to 60/40. In this silica porous film, since the coating film and the substrate, or the particles in the coating film adhere to each other due to mixing the hydrolyzate of the silicon alkoxide, adhesion to the base material is good and it is difficult for generation of cracks to occur. The technical reason why this silica porous film is formed is not sufficiently understood at present, but is assumed to be as follows. That is, in general, fumed silica particles exist as aggregates, and amorphous secondary particles of several tens to several hundreds of nm are obtained through crushing and dispersion. By coating and drying a liquid composition containing the particles on a substrate, the secondary particles become stacked. At this time, since the particles are amorphous, it is thought that dense filling in the film is sterically hindered and many holes can be formed in the film.

The silica porous film of the third aspect of the invention has good adhesion to the base material, it is difficult for generation of cracks to occur therein, and the film is suitable for separating particles having a mean particle diameter of 10 nm to 200 nm.

BRIEF DESCRIPTION OF DRAWING

FIG. 1 is a scanning electron micrograph of a surface of a silica porous film formed from a liquid composition of Example 1 at a magnification of 300,000.

BEST MODE FOR CARRYING OUT THE INVENTION

Next, embodiments of the invention will be described.

A liquid composition for forming a silica porous film of the invention is prepared by mixing a hydrolyzate of tetramethoxysilane or tetraethoxysilane as a silicon alkoxide, that is, a binder with a silica sol in which fumed silica particles having a specific particle diameter are dispersed in a liquid medium.

Silicon Alkoxide

Specific examples of the silicon alkoxide include tetramethoxysilane and tetraethoxysilane. Among these, tetramethoxysilane is preferred for obtaining a film having high hardness.

Preparation of Hydrolyzate (Binder) of Silicon Alkoxide

The hydrolyzate of the silicon alkoxide of the liquid composition of the invention, that is, the binder is obtained by causing a hydrolysis reaction of the silicon alkoxid by mixing, with respect to 1 part by mass of the silicon alkoxide, 0.5 to 5.0 parts by mass of water, 0.005 to 0.5 parts by mass of an organic acid or an inorganic acid, and 1.0 to 5.0 parts by mass of an organic solvent such as an alcohol, a glycol ether, or a glycol ether acetate. The $SiO_2$ concentration ($SiO_2$ content) of this hydrolyzate is 1% by mass to 20% by mass, and particularly preferably 5% by mass to 15% by mass. When the $SiO_2$ concentration of the hydrolyzate is lower than the lower limit value, a reduction in the adhesion of the film and the generation of cracks easily occur. When the $SiO_2$ concentration of the hydrolyzate is higher than the upper limit value, there is a concern that the reaction liquid may gelate and may not be mixed with the silica sol. Here, the reason for limiting the ratio of the water in the above range is that when the ratio of the water is lower than the lower limit value, the hydrolysis rate is reduced, and thus the holding properties of the porous structure and the adhesion of the coating film are insufficient, and when the ratio of the water is higher than the upper limit value, the reaction liquid gelates during the hydrolysis reaction and cannot be mixed with the silica sol. The ratio of the water is preferably 0.8 parts by mass to 3.0 parts by mass. As the water, ion exchange water, pure water, or the like is preferred in order to prevent mixing of impurities.

The organic acid or the inorganic acid functions as an acidic catalyst for promoting the hydrolysis reaction. Examples of the organic acid include a formic acid and an oxalic acid, and examples of the inorganic acid include a hydrochloric acid and a nitric acid. Among these, a formic acid is preferred. The reason why the formic acid is preferred is that by using the formic acid, the hydrolysis rate is appropriately low in comparison to other acids, and it is more effective for preventing the promotion of uniform gelation in the obtained porous film. In addition, the reason for limiting the ratio of the organic acid or the inorganic acid in the above range is that when the ratio of the organic acid or the inorganic acid is lower than the lower limit value, the film is not formed due to poor reactivity, and when the ratio of the organic acid or the inorganic acid is higher than the upper limit value, defects such as corrosion of the base material by the remaining acid may be caused although the reactivity is not affected. The ratio of the organic acid or the inorganic acid is preferably 0.008 parts by mass to 0.2 parts by mass.

Examples of the alcohol used as the organic solvent include methanol, ethanol, propanol, and isopropyl alcohol (IPA). In addition, examples of the glycol ether include ethylene glycol monomethyl ether, diethylene glycol monomethyl ether, propylene glycol monomethyl ether, dipropylene glycol monomethyl ether, ethylene glycol monoethyl ether, diethylene glycol monoethyl ether, propylene glycol monoethyl ether, and dipropylene glycol monoethyl ether. In addition, examples of the glycol ether acetate include ethylene glycol monomethyl ether acetate, diethylene glycol monomethyl ether acetate, propylene glycol monomethyl ether acetate, dipropylene glycol monomethyl ether acetate, ethylene glycol monoethyl ether acetate, diethylene glycol monoethyl ether acetate, propylene glycol monoethyl ether acetate, and dipropylene glycol monoethyl ether acetate. The reason for limiting the organic solvent to the alcohol, the glycol ether, or the glycol ether acetate is that these are easily mixed with the silicon alkoxide. Among these, from the viewpoint that the hydrolysis reaction is easily controlled and good coatability is obtained in the formation of the film, ethanol, isopropyl alcohol, ethylene glycol monomethyl ether, and ethylene glycol monomethyl ether acetate are preferred. The ratio of the organic solvent is preferably 1.5 parts by mass to 3.5 parts by mass. The reason for limiting the ratio of the organic solvent in the above range, is that when the ratio of the organic solvent is lower than the lower limit value, the reaction liquid easily gelates during the hydrolysis reaction, and when the ratio of the organic solvent is higher than the upper limit value, the reactivity of the hydrolysis is reduced, and thus the adhesion of the film is reduced.

Preparation of Silica Sol

The silica sol of the liquid composition of the invention is a sol in which fumed silica particles are dispersed in a liquid medium. The fumed silica particles are dry silica particles obtained by a spray flame method that is a gas phase method for causing a flame hydrolysis reaction of a volatile silicon compound such as a halogenated silicon compound. The fumed silica particles used in the invention are particles in which a specific surface area (BET value) of primary particles is 50 m$^2$/g or greater. After being dispersed in the liquid medium to be described below, the fumed silica particles have primary particles having a mean particle diameter of 40 nm or less, and preferably 5 nm to 40 nm, and secondary particles having a mean particle diameter of 20 nm to 400 nm, that is greater than the mean particle diameter of the primary particles. When the mean particle diameter of the primary particles is greater than the upper limit value, cracks are generated in the film. In addition, when the mean particle diameter of the secondary particles is less than the lower limit value, cracks are generated that are assumed to be due to the relaxation of stress in the film, and when the mean particle diameter of the secondary particles is greater than the upper limit value, the porosity increases, and thus the film strength is reduced and cracks are generated. In the invention, the mean particle diameter of the fumed silica particles is a volume-basis median diameter measured using a dynamic light scattering-type particle diameter distribution measuring apparatus. The specific surface area (BET value) of the primary particles is a value obtained using a value calculated by a BET 3-point method of measuring the value by adsorbing a nitrogen gas. The secondary particles are aggregates of the primary particles. The state in which the fumed silica particles are dispersed in the silica sol, that is, the state in which the fumed silica particles are dispersed in the liquid medium will be described below. The mean particle diameter of the secondary particles is more preferably 100 nm to 250 nm, but is not limited thereto.

The appearance of the fumed silica particle dispersion is a transparent or cloudy liquid. The size of the secondary particle diameter is associated with the appearance or the viscosity, and the smaller the particles, the more transparent the liquid and the lower the viscosity thereof.

Examples of the liquid medium in which the fumed silica particles are dispersed include methanol, ethanol, isopropyl alcohol, ethylene glycol, propylene glycol monomethyl ether, and propylene glycol monomethyl ether acetate. The SiO$_2$ concentration (SiO$_2$ content) of the silica sol is more preferably 5% by mass to 40% by mass. When the SiO$_2$ concentration of the silica sol is too low, the film after the formation does not have a porous structure, and when the SiO$_2$ concentration of the silica sol is too high, the SiO$_2$ in the silica sol easily aggregates, and sometimes, the silica sol gelates. Therefore, the silica sol may not be mixed with the hydrolyzate of the silicon alkoxide. A dispersant having a basic functional group such as an amine group can also be used when the fumed silica particles are dispersed in the liquid medium. The SiO$_2$ concentration of the silica sol is more preferably 10% by mass to 35% by mass, but is not limited thereto.

Preparation of Liquid Composition for Forming Silica Porous Film

The liquid composition for forming a silica porous film includes the hydrolyzate (binder) and the silica sol, and is prepared by mixing them such that when the SiO$_2$ content in the hydrolyzate is denoted by A, and the SiO$_2$ content of the silica sol is denoted by B, the mass ratio A/B is 1/99 to 60/40, and preferably 5/95 to 50/50. The lower the mass ratio, the larger the hole diameter of the film when the silica porous film is formed. The higher the mass ratio, the smaller the hole diameter of the film. When the ratio A/B is lower than the lower limit value, the hardness of the film after the formation is reduced, and the film becomes very brittle. When the ratio A/B is higher than the upper limit value, the holes in the film disappear, and a film having a porous structure is not obtained. By arbitrarily controlling the mass ratio A/B, that is, by arbitrarily controlling the mixing ratio between the hydrolyzate and the silica sol, the hole diameter of the silica porous film to be obtained by coating with the liquid composition can be controlled within a desired range of 10 nm to 200 nm. In the preparation of the liquid composition for forming a silica porous film of the invention, in addition to the hydrolyzate and the silica sol, a solvent may be added and mixed in order to adjust the viscosity of the composition and to obtain a coating film having a target film thickness. Examples of this solvent include methanol, ethanol, methyl ethyl ketone, isopropyl alcohol, water, propylene glycol 1-monomethyl ether, propylene glycol 1-monomethyl ether 2-acetate, and ethylene glycol.

Next, the procedure of the preparation of the liquid composition for forming a silica porous film will be described. In order to prepare this liquid composition, first, an organic solvent is added to a silicon alkoxide, and these are preferably stirred for 5 minutes to 20 minutes at a temperature of 30° C. to 40° C. to prepare a first liquid. In addition, water is mixed with an organic acid or an inorganic acid, and these are preferably stirred for 5 minutes to 20 minutes at a temperature of 30° C. to 40° C. to separately prepare a second liquid. Since tetramethoxysilane or the like that is used as the silicon alkoxide has high toxicity, it is desirable to use an oligomer obtained by previously polymerizing about 3 to 6 monomers. Next, the prepared first liquid is preferably held at a temperature of 30° C. to 80° C., and the second liquid is added to the first liquid and preferably stirred for 30 minutes to 180 minutes in a state in which the temperature is maintained. Accordingly, a hydrolyzate of the silicon alkoxide is generated. By mixing the hydrolyzate and the silica sol at the above-described predetermined ratio, the liquid composition of the invention is obtained.

Formation of Silica Porous Film

Next, a silica porous film forming method of forming a silica porous film using this liquid composition will be described. First, a base material such as an open pore-type porous laminated body shown in Patent Document 1, a glass substrate, or a plastic film is prepared, and a surface of this base material is coated with the above-described composition for forming a silica porous film through, for example, a spin coating method, a die coating method, a spray method, or the like. After the coating, the base material is preferably dried for 5 minutes to 60 minutes at a temperature of 50° C. to 100° C. using a hot plate, an atmosphere baking furnace, or the like, and then preferably baked for hardening for 5 minutes to 120 minutes at a temperature of 100° C. to 300° C. using a hot plate, an atmosphere baking furnace, or the like. The silica porous film formed in this manner is configured to include: fumed silica particles having primary particles having a mean particle diameter of 40 nm or less and secondary particles having a mean particle diameter of 20 nm to 400 nm, that is greater than the mean particle diameter of the primary particles; and a hardened component of a binder existing as SiO$_2$, and the mean hole diameter of the film is in a range of 10 nm to 200 nm. In this silica porous film, holes having a desired hole diameter are formed in the film. This silica porous film has good adhesion to the base material, and it is difficult for generation of cracks to occur therein. The reason for this is that the hydrolyzate (binder)

of the silicon alkoxide is hardened, and the amorphous SiO$_2$ component existing between the fumed silica particles in the film or between the coating film and the substrate strongly adhere between the fumed silica particles or between the coating film and the substrate. This amorphous SiO$_2$ component can be confirmed by performing TEM observation of a cross-section of the porous film and by detecting the amorphous SiO$_2$ component existing between the fumed silica particles or between the coating film and the substrate through elemental analysis. Accordingly, the silica porous film is available for use in, for example, a catalyst carrier, a filter body, or the like. When this silica porous film is a self-supported film having no base material, it can be used as a gas filter. This self-supported film is obtained by coating and thermally hardening a porous film forming material on a substrate provided with a release layer and by then peeling the coating film from the substrate. This self-supported film has a film thickness of about 1 mm. This film has excellent antifogging properties, and is thus available for use in a film for coating of a mirror, glasses, or the like.

EXAMPLES

Next, examples of the invention will be described in detail together with comparative examples.

Preparation of 11 Kinds of Hydrolyzates of Silicon Alkoxide

As shown in Table 1, tetramethoxysilane (TMOS) and tetraethoxysilane (TEOS) were prepared as a silicon alkoxide, a formic acid and a nitric acid were prepared as an inorganic acid or an organic acid, and propylene glycol monomethyl ether acetate (PGMEA) was prepared as an organic solvent. These were blended in amounts shown in Table 1, and thus 11 kinds of hydrolyzates of the silicon alkoxide (Nos. 1 to 11) were prepared.

For example, the hydrolyzate of the silicon alkoxide of No. 1 was prepared by the following method. First, tetramethoxysilane (TMOS) was prepared as a silicon alkoxide, 1.5 parts by mass of propylene glycol monomethyl ether acetate (PGMEA) was added as an organic solvent with respect to 1 part by mass of the silicon alkoxide, and these were stirred for 15 minutes at a temperature of 30° C. to prepare a first liquid. As the silicon alkoxide, an oligomer obtained by previously polymerizing 3 to 5 monomers was used. Separately from the first liquid, 1.0 part by mass of ion exchange water and 0.02 parts by mass of a formic acid were put into a beaker and mixed with respect to 1 part by mass of the silicon alkoxide, and this mixture was stirred for 15 minutes at a temperature of 30° C. to prepare a second liquid. Next, the prepared first liquid was held at a temperature of 55° C. in a water bus, and then the second liquid was added to this first liquid and stirred for 60 minutes in a state in which the temperature was maintained. Accordingly, a hydrolyzate of the silicon alkoxide was obtained. Hydrolyzates of the silicon alkoxide of Nos. 2 to 11 were prepared in the same manner as in the method of preparing the hydrolyzate of the silicon alkoxide of No. 1 by changing the kind and the amount of the silicon alkoxide, the amount of the water, the kind and the amount of the acid, and the amount of the organic solvent.

Preparation of 9 Kinds of Silica Sols

As shown in Table 2, silica particles which were manufactured through a gas phase method or a wet method and in which primary particles and secondary particles had different mean particle diameters were prepared. Among liquid solvents, propylene glycol monomethyl ether (PGME) and propylene glycol monomethyl ether acetate (PGMEA) were prepared as a main solvent, and among liquid solvents, "SOLSPERSE 54000 (registered trademark)" (product name) manufactured by The Lubrizol Corporation, that was a non-ionic dispersant, and "SOLSPERSE 71000 (registered trademark)" that was a basic dispersant were prepared as dispersants. These were blended in amounts shown in Table 2, and thus 9 kinds (I to IX) of silica sols were prepared.

Specifically, the silica sol I was prepared by the following method. Fumed silica particles (manufactured by Wacker Chemie AG, product name: T40 (registered trademark)) in which a specific surface area (BET value) obtained by a flame spray method (dry method) that was a gas phase method was 400 m$^2$/g were added to and mixed with a liquid medium in which a dispersant (manufactured by The Lubrizol Corporation, product name: "SOLSPERSE 54000 (registered trademark)") was added to propylene glycol monomethyl ether (PGME). The fumed silica particles had primary particles having a mean particle diameter of 5 nm and secondary particles having a mean particle diameter of 200 nm. The mixture was prepared such that 5 parts by mass of the propylene glycol monomethyl ether (PGME) and 0.2 parts by mass of the dispersant were mixed with respect to 1 part by mass of the fumed silica particles. A glass tube was filled with this mixture together with 5 parts by mass of zirconia beads of 0.5 mmφ with respect to 1 part by mass of the fumed silica, and sealed, and the mixture was dispersed for 10 hours by a bead disperser to obtain a silica sol.

The silica sol II was prepared in the same manner as in the case of I, except that fumed silica particles (manufactured by Nippon Aerosil, product name: AEROSIL 200 (registered trademark)) obtained by a gas phase method were used. The fumed silica particles had a mean particle diameter of primary particles, a mean particle diameter of secondary particles, and a specific surface area (BET value), that are shown in Table 2.

The silica sol III was prepared in the same manner as in the case of I, except that fumed silica particles (manufactured by Nippon Aerosil, product name: AEROSIL 50 (registered trademark)) obtained by a gas phase method were used. The fumed silica particles had a mean particle diameter of primary particles, a mean particle diameter of secondary particles, and a specific surface area (BET value), that are shown in Table 2.

The silica sol IV was prepared in the same manner as in the case of I, except that the amount of the dispersant to be added was 0.3 parts by mass. The fumed silica particles had a mean particle diameter of primary particles, a mean particle diameter of secondary particles, and a specific surface area (BET value), that are shown in Table 2.

The silica sol V was prepared in the same manner as in the case of I, except that the amount of the dispersant to be added was 0.05 parts by mass. The fumed silica particles had a mean particle diameter of primary particles, a mean particle diameter of secondary particles, and a specific surface area (BET value), that are shown in Table 2.

The silica sol VI was prepared in the same manner as in the case of 1, except that the kind of the liquid solvent was PGMEA. The fumed silica particles had a mean particle diameter of primary particles, a mean particle diameter of secondary particles, and a specific surface area (BET value), that are shown in Table 2.

The silica sol VII was prepared in the same manner as in the case of I, except that the diameter of the zirconia beads was 0.3 mmφ. The fumed silica particles had a mean particle diameter of primary particles, a mean particle diameter of secondary particles, and a specific surface area (BET value), that are shown in Table 2.

The silica sol VIII was prepared in the same manner as in the case of I, except that the dispersion time was 30 hours. The fumed silica particles had a mean particle diameter of primary particles, a mean particle diameter of secondary particles, and a specific surface area (BET value), that are shown in Table 2.

The silica sol IX was prepared in the same manner as in the case of I, except that the kind of the dispersant to be added was a basic dispersant (manufactured by The Lubrizol Corporation, product name: "SOLSPERSE 71000 (registered trademark)"). The fumed silica particles had a mean particle diameter of primary particles, a mean particle diameter of secondary particles, and a specific surface area (BET value), that are shown in Table 2.

Preparation of Liquid Compositions for Forming Silica Porous Film of Examples 1 to 14 and Comparative Examples 1 and 2

Next, the 11 kinds of hydrolyzates of the silicon alkoxide shown in Table 1 and the 9 kinds of silica sols shown in Table 2 were collected in combinations shown in Table 3, and a hydrolyzate (A) of the silicon alkoxide and a silica sol (B) were mixed and stirred in amounts shown in Table 3, and thus a liquid composition was obtained.

Evaluation

The composition prepared in each of Examples 1 to 14 and Comparative Examples 1 and 2 was diluted with propylene glycol monomethyl ether (PGME) to provide a coating liquid. This coating liquid was coated on a surface of a glass substrate as a base material by a spin coating method to form a film. The glass substrate on which the film was formed was baked for hardening for 30 minutes at a temperature of 120° C. using an atmosphere baking furnace, and thus a silica porous film having a thickness of about 200 nm was formed. Regarding the film, a hole diameter in the surface of the silica porous film was observed using a scanning electron microscope (manufactured by Hitachi High-Technologies Corporation, model number: SU-8000). FIG. 1 shows a scanning electron micrograph of the surface of the silica porous film formed from the liquid composition of Example 1 at a magnification of 300,000.

Regarding the silica porous films produced from the compositions prepared in Examples 1 to 14 and Comparative Examples 1 and 2, mean hole diameters, adhesion to the base material, and the presence or absence of cracks in the surface of the silica porous film are shown in Table 4. Evaluation tests were performed by the following methods.

(1) Mean hole diameter: The mean hole diameter was obtained using image processing software "ImageJ (developed by National Institutes of Health). An SEM image of the surface was subjected to binarization processing, and a silica skeleton part and hole parts were determined. Regarding the respective hole parts, the areas thereof were calculated from the number of pixels, and each calculated area was converted into a true circle to obtain a hole diameter. An arithmetic mean value of the hole diameters was defined as a mean hole diameter. Since holes having a diameter of 5 nm or less are ill-defined by the limit of resolution, these were not subjected to the measurement.

(2) Adhesion: A tape was adhered to the surface of the obtained silica porous film having a thickness of about 200 nm, and a tape test was performed according to the points of a cross-cut method (JIS K 5600-5-6) (cross-cut adhesion test). A case in which the film was not adhered at all to the tape was recorded as "good", a case in which the tape was slightly light-colored and breakage partially occurred in the film was recorded as "available", and a case in which the film was completely adhered to the tape and peeled from the substrate interface was recorded as "not available".

(3) The presence or absence of cracks: The surface (50 mm×50 mm) of the obtained silica porous film having a thickness of about 200 nm was visually observed. A case in which there were cracks was recorded as "cracks", and a case in which there were no cracks was recorded as "none".

TABLE 1

(Recipe for Preparing Hydrolyzate of Silicon Alkoxide)

| Kind of Hydrolyzate | Silicon Alkoxide | | | Water | Inorganic Acid or Organic Acid | | Organic Solvent | |
|---|---|---|---|---|---|---|---|---|
| | Kind | Parts by Mass | SiO$_2$ Concentration (% by mass) | Parts by Mass | Kind | Parts by Mass | Kind | Parts by Mass |
| No. 1 | TMOS | 1 | 10 | 1.0 | Formic Acid | 0.02 | PGMEA | 1.5 |
| No. 2 | TEOS | 1 | 10 | 1.0 | Formic Acid | 0.02 | PGMEA | 1.5 |
| No. 3 | TMOS | 1 | 10 | 1.0 | Nitric Acid | 0.02 | PGMEA | 1.5 |
| No. 4 | TMOS | 1 | 10 | 0.1 | Formic Acid | 0.02 | PGMEA | 1.5 |
| No. 5 | TMOS | 1 | 10 | 3.0 | Formic Acid | 0.02 | PGMEA | 1.5 |
| No. 6 | TMOS | 1 | 10 | 1.0 | Formic Acid | 0.001 | PGMEA | 1.5 |
| No. 7 | TMOS | 1 | 10 | 1.0 | Formic Acid | 2.0 | PGMEA | 1.5 |
| No. 8 | TMOS | 1 | 10 | 1.0 | Formic Acid | 0.02 | PGMEA | 0.1 |
| No. 9 | TMOS | 1 | 10 | 1.0 | Formic Acid | 0.02 | PGMEA | 7.5 |
| No. 10 | TMOS | 0.05 | 0.5 | 1.0 | Formic Acid | 0.02 | PGMEA | 1.5 |
| No. 11 | TMOS | 2.5 | 25 | 1.0 | Formic Acid | 0.02 | PGMEA | 1.5 |

TABLE 2

(Recipe for Preparing Silica Sol)

| Kind of Silica Sol | Silica Particles | | | | Liquid Solvent | | | | |
|---|---|---|---|---|---|---|---|---|---|
| | Manufacturing Method | Mean Particle Diameter (nm) | | Specific Surface Area (m²/g) | Parts by Mass | Main Solvent | | Dispersant | |
| | | Primary Particles | Secondary Particles | | | Kind | Parts by Mass | Kind | Parts by Mass |
| I | Gas Phase Method | 5 | 200 | 400 | 1 | PGME | 5 | S54000 | 0.2 |
| II | Gas Phase Method | 12 | 100 | 200 | 1 | PGME | 5 | S54000 | 0.2 |
| III | Gas Phase Method | 40 | 150 | 50 | 1 | PGME | 5 | S54000 | 0.2 |
| IV | Gas Phase Method | 5 | 20 | 400 | 1 | PGME | 5 | S54000 | 0.3 |
| V | Gas Phase Method | 5 | 400 | 400 | 1 | PGME | 5 | S54000 | 0.05 |
| VI | Gas Phase Method | 5 | 220 | 400 | 1 | PGMEA | 5 | S54000 | 0.2 |
| VII | Gas Phase Method | 5 | 220 | 400 | 1 | PGME | 5 | S54000 | 0.2 |
| VIII | Gas Phase Method | 5 | 160 | 400 | 1 | PGME | 5 | S54000 | 0.2 |
| IX | Gas Phase Method | 5 | 250 | 400 | 1 | PGME | 5 | S71000 | 0.2 |

TABLE 3

(SiO₂ Content and Mass Ratio in Liquid Composition for Forming Silica Porous Film)

| | SiO$_2$ Content | | | | Mass Ratio (A/B) |
|---|---|---|---|---|---|
| | Hydrolyzate of Silicon Alkoxide (A) | | Silica Sol (B) | | |
| | Kind | % by Mass | Kind | % by Mass | |
| Example 1 | No. 1 | 1 | I | 99 | 1/99 |
| Example 2 | No. 1 | 1.5 | I | 1 | 60/40 |
| Example 3 | No. 2 | 1 | I | 99 | 1/99 |
| Example 4 | No. 3 | 1 | I | 99 | 1/99 |
| Example 5 | No. 1 | 1 | II | 99 | 1/99 |
| Example 6 | No. 1 | 1 | III | 99 | 1/99 |
| Example 7 | No. 1 | 1 | IV | 99 | 1/99 |
| Example 8 | No. 1 | 1 | V | 99 | 1/99 |
| Example 9 | No. 1 | 1 | VI | 99 | 1/99 |
| Example 10 | No. 1 | 1 | VII | 99 | 1/99 |
| Example 11 | No. 1 | 1 | VIII | 99 | 1/99 |
| Example 12 | No. 1 | 1 | IX | 99 | 1/99 |
| Example 13 | No. 1 | 1 | I | 19 | 5/95 |
| Example 14 | No. 1 | 1 | I | 1 | 50/50 |
| Comparative Example 1 | No. 1 | 0 | I | 100 | 0/100 |
| Comparative Example 2 | No. 1 | 1.86 | I | 1 | 65/35 |

TABLE 4

(Results of Evaluation on Mean Hole Diameter of Silica Porous Film, Adhesion, and Presence or Absence of Cracks)

| | Mean Hole Diameter (nm) | Adhesion | Presence or Absence of Cracks |
|---|---|---|---|
| Example 1 | 100 | Good | None |
| Example 2 | 15 | Good | None |
| Example 3 | 100 | Available | None |
| Example 4 | 100 | Good | None |
| Example 5 | 50 | Good | None |
| Example 6 | 70 | Good | None |
| Example 7 | 10 | Good | None |
| Example 8 | 200 | Good | None |
| Example 9 | 120 | Good | None |
| Example 10 | 120 | Good | None |
| Example 11 | 70 | Good | None |
| Example 12 | 130 | Good | None |
| Example 13 | 95 | Good | None |
| Example 14 | 20 | Good | None |
| Comparative Example 1 | 100 | Not Available | Cracks |
| Comparative Example 2 | 0 | Good | None |

As seen in Table 4, in Comparative Example 1, the mean hole diameter of the obtained film was 100 nm, but the adhesion to the base material was poor, and cracks were generated in the surface of the film. In Comparative Example 2, the adhesion to the base material was good, and no cracks were generated in the surface of the film. However, the mean hole diameter was zero, and the porous film was not formed. In contrast, in Examples 1 to 14, the obtained films had a mean hole diameter of 10 nm to 200 nm, and were porous films. All of the films obtained in Examples 1 to 14 had acceptable or good adhesion, and no cracks were generated in the surface of the film.

INDUSTRIAL APPLICABILITY

A liquid composition of the invention can be used in the formation of a silica porous film suitable for use in a catalyst carrier, a gas filter, a filter body, or the like.

The invention claimed is:

1. A liquid composition for forming a silica porous film, comprising
   a hydrolyzate of tetramethoxysilane or tetraethoxysilane as a silicon alkoxide, and
   a silica sol in which fumed silica particles having primary particles having a mean particle diameter of 40 nm or less and secondary particles having a mean particle diameter of 20 nm to 400 nm, that is greater than the mean particle diameter of the primary particles, are dispersed in a liquid medium,
   wherein a mass ratio (A/B) between a $SiO_2$ content (A) in the hydrolyzate and a $SiO_2$ content (B) of the silica sol is in a range of 1/99 to 60/40,
   the hydrolyzate of tetramethoxysilane or tetraethoxysilane is obtained by a hydrolysis reaction of tetramethoxysilane or tetraethoxysilane in the presence of an acidic catalyst,
   a $SiO_2$ concentration of the hydrolyzate is 1% by mass to 20% by mass, and
   a $SiO_2$ concentration of the silica sol is 5% by mass to 40% by mass.

2. The liquid composition for forming a silica porous film according to claim 1, wherein
   the $SiO_2$ concentration of the silica sol is 10% by mass to 35% by mass.

3. The liquid composition for forming a silica porous film according to claim 1, wherein
   the liquid medium includes a propylene glycol monomethyl ether or a propylene glycol monomethyl ether acetate.

* * * * *